United States Patent Office 3,746,682
Patented July 17, 1973

3,746,682
SYNERGISTIC ANTIBLOCK SYSTEMS FOR A 2-ETHYLHEXYL ACRYLATE/ACRYLONITRILE COPOLYMER
William A. Watts, Akron, Ohio, assignor to The Goodyear Tire & Rubber Company, Akron, Ohio
No Drawing. Filed Oct. 3, 1972, Ser. No. 294,698
Int. Cl. C08f 45/44
U.S. Cl. 260—32.6 N                  4 Claims

ABSTRACT OF THE DISCLOSURE

Acrylate film such as the polymers of 2-ethylhexyl acrylate and acrylonitrile are compounded with a combination of fatty amides to improve the antiblocking characteristics of the film.

This invention relates to improved acrylate film and particularly to a method of improving the antiblocking properties of the film, such as 2-ethylhexyl acrylate/acrylonitrile film. More specifically, the particular combinations of antiblocking materials of this invention produce synergistic antiblocking effects when used with the above film.

Many films and sheets of plastic tend to "block" when stacked or rolled upon themselves. This blocking or sticking of the sheets to themselves can either be a tolerable nuisance or an intolerable problem, and the compounder is continually required to reduce or eliminate blocking tendencies. Waxes, soaps, silicones, powders, vegetable lecithins, and many other ingredients are commonly used as antiblocking agents.

It has been discovered that several combinations of primary fatty amides each produce a synergistic effect when used in the film to reduce adhesion between layers of the film. More particularly, it has been found that less total agent is required when used in the combinations of this invention than when used separately to produce the same effect.

The following amides were evaluated for their antiblocking properties: (1) HTSA No. 3, a $C_{40}$ straight chain primary saturated fatty amide having the formula

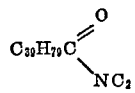

hereinafter referred to as Agent A, (2) HTSA No. 1, a saturated $C_{34}$ straight chain primary saturated fatty amide having the formula

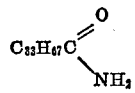

hereinafter referred to as Agent B, (3) behenamide having the formula

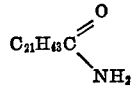

hereinafter referred to as Agent C, and (4) stearamide haivng the formula

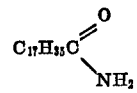

hereinafter referred to as Agent D. In order to more fully illustrative the present invention, the following data are given.

Polymers were prepared by an emulsion polymerization technique in which 186 parts by weight of deionized water, 7.4 parts by weight (28% active surfactant) sodium tetradecyl sulfate, and 0.1 part by weight of $K_2S_2O_8$ (potassium persulfate), was charged to an evacuated reactor and then the charged reactor was flushed twice with nitrogen. Forty parts by weight of acrylonitrile, 60 parts by weight of 2-ethylhexyl acrylate, 0.0–0.5 part by weight (55% active) of divinyl benzene, and 0–1.0 part by weight of mixed tertiary mercaptans, was then charged to the reactor and the batch heated to 140° F. (60° C.) and stirred at 250 revolutions per minute using a turbine agitator with baffles. Twenty-five pounds per square inch of nitrogen pressure was maintained in the reactor. The reaction was conducted until 34.5 percent solids content was obtained. The batch was then cooled to room temperature and the following emulsified dispersions were added: 0.1 part by weight of a sterically hindered phenolic antioxidant, 0.1 part by weight of dilaurylthiodipropionate, 0.5 part of a thermoplastic phosphite copolymer of pentaerythritol and hydrogenated bisphenol A having M.W. 2000 to 2300, M.P. 50° C. and phosphorous content of 11% to 13%, and 1.0 part by weight of 2-hydroxy-4-n-octoxy benzophenone in water. The latex was coagulated in a hot aqueous 3.0 weight percent magnesium sulfate solution and washed thoroughly with deionized water. The coagulated crumb was dried in an oven at 50° C. (122° F.).

If after the monomers are added to the reactor, and maintained under 25 p.s.i. nitrogen in the reactor, the batch fails to initiate within one hour, the following solution is added: 0.03 part by weight of sodium bisulfite dissolved in 1.0 part by weight of deionized water. If the total run fails to reach 34.5 weight percent solids the following is added: 0.03 part by weight of sodium bisulfite in 1.0 part by weight of deionized water, and 0.03 part by weight of potassium persulfate in 1.0 part by weight of deionized water.

The compounding variable was the amount of antiblocking agents used. The films were prepared by first dispersing and dissolving all the ingredients in tetrahydrofuran at 120° F. to 130° F. using a relatively low speed, laboratory air stirrer and then casting the solution on glass plates. The resultant cast polymer solution is partially dried in a plate oven at 120° F. The partially dried films were then completely dried in a dynamic air oven at 170° F. for thirty minutes. All films were made to a thickness of one mil.

Various combinations of A, B, C and D were tried in various amounts on the base formula. These combinations of agents produce an antiblocking effect of synergistic proportions. This result was obtained without loss of the appearance or physical properties of the original untreated film.

Each formulation below was mixed at 120° F. to 130° F. in a 16-ounce bottle. After complete mixing of all ingredients, films were cast on 8" x 11" glass plates. The resultant cast films were stripped and stored at room temperature prior to block tests. All parts are by weight.

| Formulation | 1 | 2 | 3 | 4 | 5 | 6 | 7 | 8 | 9 | 10 |
|---|---|---|---|---|---|---|---|---|---|---|
| Film polymer | 100 | 100 | 100 | 100 | 100 | 100 | 100 | 100 | 100 | 100 |
| Agent A | 1.0 | | | | 0.75 | 0.75 | | | | 0.75 |
| Agent B | | 1.0 | | | | | 0.75 | 0.75 | 0.75 | |
| Agent C | | | 1.0 | | | 0.10 | 0.10 | | 0.075 | 0.075 |
| Agent D | | | | 1.0 | 0.10 | | | 0.1 | 0.075 | 0.075 |
| Combination of | A | B | C | D | A+D | A+C | B+C | B+D | B+C+D | A+C+D |

NOTE.—Formulations 1, 2, 3 and 4 are controls.

Films were prepared from each formulation, according to the aforementioned procedure. Comparison of the formulations was made according to two antiblocking tests run as follows: (1) Two film samples are placed together so that a 5″ x 5″ piece is obtained. This piece is placed between two metal plates and a 25 pound weight is placed over the top plate. The whole assembly is placed in a dynamic air oven at 140° F. for 24 hours and then tested for blocking (sticking or adhesion). This test is reported below. (2) The second test involves two film samples placed together so that a 2″ x 2″ piece is obtained. This piece is placed between two metal plates and a 200 gram weight is placed over the top plate. The whole assembly is placed in a dynamic air oven at 120° F. for 16 hours. At the end of this period, the film is tested for blocking (sticking or adhesion) resistance as shown below by measuring the force in grams required to separate the films.

| Formulation | 1 | 2 | 3 | 4 | 5 | 6 | 7 | 8 | 9 | 10 |
|---|---|---|---|---|---|---|---|---|---|---|
| Block test (1) | B | B | B | B | NB | NB | NB | NB | NB | NB |
| Block test (2) in grams | T | T | T | T | 50 | 28 | 11 | 100 | 5 | 35 |

NOTE.—B=Block; NB=Non-blocking; T=Film tore during test (above about 1,000 grams).

As noted from the data above, it has been discovered that the combinations of several primary fatty saturated amides exhibit synergistic characteristics when used as antiblocking systems for 2-ethylhexyl acrylate and acrylonitrile copolymer.

These amides may be used in any combination of parts per 100 parts resin within the following ranges:

Agent A _____ 0.5–1.50
Agent B _____ 0.5–1.50
Agent C _____ 0.03–0.5
Agent D _____ 0.03–0.5

It is preferred to use no more than about 1.0 part of any one combination of amides to insure optimum film properties including clarity as well as being economical in the use of these amides.

The acrylate films that may be advantageously treated with the combination of antiblocking agents of this invention are those polymers made from mixtures containing one or more monomers from each of the two essential classes disclosed. While the proportions of each of the two essential monomers in the monomeric mixture may vary somewhat, such variation must be within certain definite limits in order to produce clear, rubbery interpolymers having the improved properties which are the objects of this invention, yet retaining the desirable properties possessed by the polymeric alkyl acrylate.

Typical alkyl acrylates and alkyl methacrylates useful for making acrylate polymers are ethyl acrylate, n-propyl acrylate, n-butyl acrylate, isobutyl acrylate, n-octyl acrylate, 2-ethylhexyl acrylate, methyl methacrylate, butyl methacrylate, n-hexyl methacrylate, tetradecyl methacrylate, n-decyl methacrylate, and 2-ethylhexyl methacrylate.

For example, the mixture advantageously contains from 30% to 90% by weight of one or more alkyl acrylates or mixtures of acrylates and methacrylates and from 10 to 70% by weight of one or more of the vinyl nitrile monomers. It is preferred that the mixture contain from 40 to 80% of alkyl acrylate and 20 to 60% of a vinyl nitrile monomer such as acrylonitrile, methacrylonitrile and ethacrylonitrile.

The polymerization of the above monomer mixtures may be effected by a number of known methods. For example, polymerization of the alkyl acrylate or an admixture thereof with a minor proportion of alkyl methacrylate may be effected by a number of known methods. For example, polymerization of the alkyl acrylate or an admixture thereof with a minor proportion of alkyl methacrylate may be effected in solution or in a homogeneous system by the application of heat or actinic light with or without the presence of peroxygen compounds known to initiate polymerization. It is preferred, however, to carry out polymerization of the monomeric mixture in aqueous emulsion in the presence of a polymerization initiator and, if desired, a polymerization modifier. The ratio of alkyl acrylate to alkyl methacrylate may vary from 95/5 to 40/60, a major proportion of the acrylate being preferred.

Polymerization initiators include benzoyl peroxide, hydrogen peroxide, cumene, hydroperoxide, and other peroxygen compounds as well as other types of polymerization initiators such as diazoamino benzene. Those soluble in hydrocarbons are, of course, preferred in the solution or homogeneous methods in accordance with the invention. Other substances which speed up the reaction such as a reducing agent in combination with one of the peroxygen compounds may be utilized. Polymerization modifiers such as the sulfur-containing modifiers including aliphatic mercaptans usually employed in the polymerization of butadiene hydrocarbons to form rubbery polymers, have much the same effect on the polymerization of the alkyl acrylates and may be advantageously employed when a very soft polymer is desired.

If the polymerization is conducted in emulsion, a water soluble catalyst is employed. Such catalysts include potassium persulfate, ammonium persulfate and other recognized water soluble catalysts. Also, if emulsion polymerization is used, the amount of the modifier such as an aliphatic mercaptan may be increased to 0.5 to 1.0 part per 100 parts by weight of polymer.

In the polymerization of the monomeric mixtures of this invention, temperature is not critical, permissible reaction temperatures varying from as high as 100° C. or even higher down to 0° C. or even as low as —10° C. or —20° C. though the temperature preferably used in the range of 20° C. to 80° C. In solution polymerization with temperatures of 20° C. to 80° C., it is possible to obtain quantitative yields of copolymer in from about 1 to about 15 hours.

While certain representative embodiments and details have been shown for the purpose of illustrating the invention, it will be apparent to those skilled in the art that various changes and modifications may be made therein without departing from the spirit or scope of the invention.

What is claimed is:

1. A film made from the polymer resulting from the reaction of from 40 to 80 parts of an acrylate selected from at least one of the group consisting of alkyl acrylates and alkyl methacrylates whereint he alkyl group contains from 2 to 10 carbon atoms, and from 20 to 60 parts of a vinyl nitrile wherein the film contains a combination of antiblocking agents selected from the combinations of (1) a straight chain primary saturated fatty amide of the formula $C_{39}H_{79}CONH_2$ and behenamide, (2) a straight chain primary saturated fatty amide of the formula $C_{39}H_{79}CONH_2$ and stearamide, (3) a straight chain primary saturated fatty amide of the formula $C_{39}H_{79}CONH_2$, behenamide and stearamide, (4) a straight chain primary saturated fatty amide of the formula $C_{33}H_{87}CONH_2$ and behenamide, (5) a straight chain primary saturated fatty amide of the formula $C_{33}H_{67}CONH_2$ and stearamide, and (6) a straight chain primary saturated fatty amide of the formula $C_{33}H_{67}CONH_2$, behenamide and stearamide.

2. The film of claim 1 wherein the acrylate is 2-ethylhexyl acrylate and the vinyl nitrile is acrylonitrile.

3. The film of claim 2 wherein the monomers are present in amounts of 60 and 40 parts by weight respectively.

4. The film of claim 2 wherein each antiblocking agent is present in an amount from about 0.03 to 1.50.

References Cited
UNITED STATES PATENTS

| | | | |
|---|---|---|---|
| 3,470,122 | 9/1969 | Ridgeway | 260—32.6 PQ |
| 3,661,824 | 5/1972 | Patitsas | 260—32.6 N |

MORRIS LIEBMAN, Primary Examiner

P. R. MICHL, Assistant Examiner

U.S. Cl. X.R.

260—28.5 R

PO-1050
(5/69)

UNITED STATES PATENT OFFICE
CERTIFICATE OF CORRECTION

Patent No. 3,746,682                       Dated  July 17, 1973

Inventor(s) William A. Watts

It is certified that error appears in the above-identified patent and that said Letters Patent are hereby corrected as shown below:

Column 4, line 75, "$C_{33}H_{87}CONH_2$" should read -- $C_{33}H_{67}CONH_2$ --.

Signed and sealed this 27th day of November 1973.

(SEAL)
Attest:

EDWARD M. FLETCHER, JR.          RENE D. TEGTMEYER
Attesting Officer                Acting Commissioner of Patents